Figure 5:
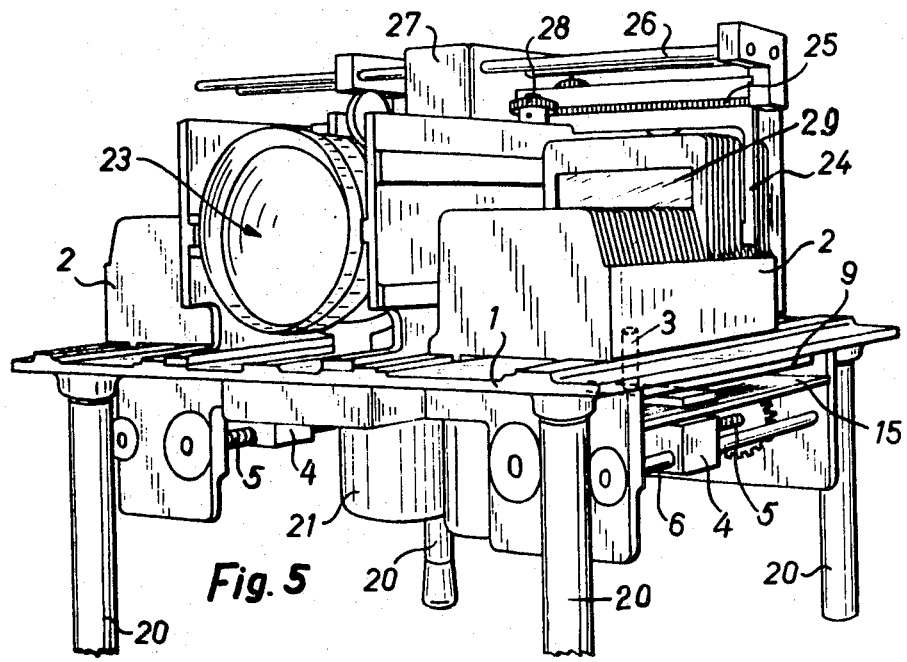

United States Patent

[11] 3,623,803

[72] Inventors Thomas Ganz
Zurich;
Leonard Ellerkamp, Adliswil; Walter
Ryter, Zurich, all of Switzerland
[21] Appl. No. 859,763
[22] Filed Sept. 22, 1969
[45] Patented Nov. 30, 1971
[73] Assignee Ganz & Co.
Zurich, Switzerland
[32] Priority Sept. 27, 1968
[33] Switzerland
[31] 145321/68

[54] PROJECTION APPARATUS
8 Claims, 6 Drawing Figs.
[52] U.S. Cl. .................................................... 353/25,
353/103
[51] Int. Cl. ..................................................... G03b 23/02
[50] Field of Search .......................................... 353/25, 26,
27, 103, 105, 106, 107, 122; 40/78.05

[56] References Cited
UNITED STATES PATENTS
| | | | |
|---|---|---|---|
| 2,594,162 | 4/1952 | Hartley | 353/106 |
| 3,143,036 | 8/1964 | Rohmann | 353/106 |
| 3,225,652 | 12/1965 | Sauppe | 353/25 |
| 3,299,554 | 1/1967 | Leaver | 40/78.05 X |
| 3,313,055 | 4/1967 | Irasek | 40/78.05 X |
| 3,372,502 | 3/1968 | Staar | 353/116 X |

FOREIGN PATENTS
| | | | |
|---|---|---|---|
| 1,226,534 | 10/1966 | Germany | 40/68.4 |

Primary Examiner—William D. Martin, Jr.
Attorney—Flynn & Frishauf

ABSTRACT: A projection apparatus for changing slides having at least one slide-cassette which is movable relative to the optical system. The slide-changing mechanism is equipped with electrical control means for an individual picture selection in such way that advance of the cassette is interrupted when the desired position is reached.

PATENTED NOV 30 1971
3,623,803
SHEET 1 OF 2
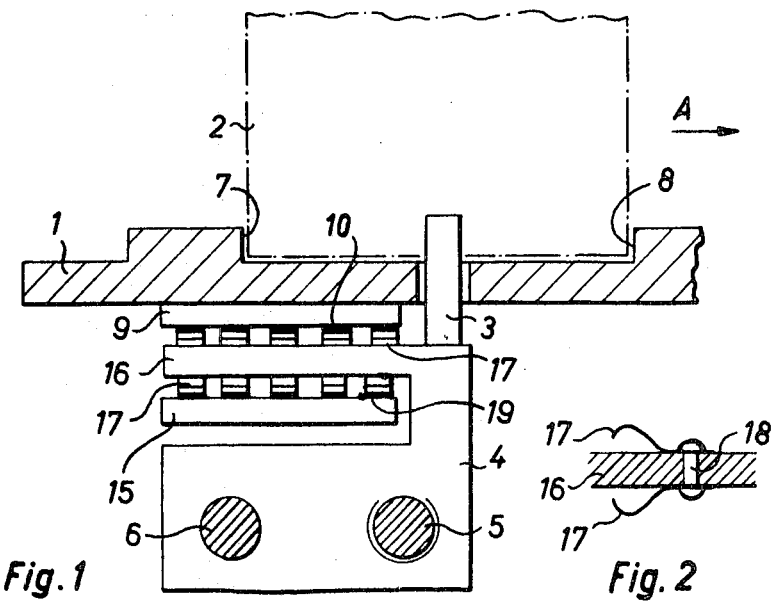
Fig. 1
Fig. 2
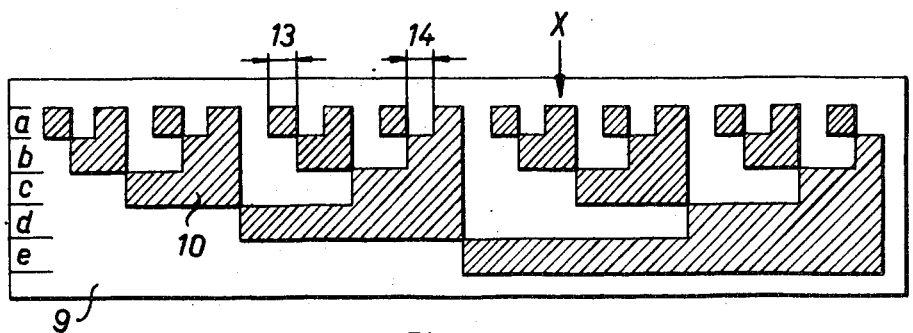
Fig. 3
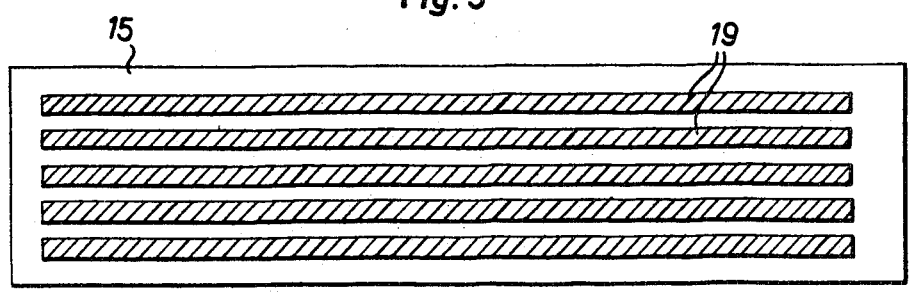
Fig. 4
THOMAS GANZ,
LEONARD ELLERKAMP,
WALTER RYTER,
INVENTORS

PROJECTION APPARATUS

This invention relates to transmission projection apparatus having at least one transparency cassette moveable relative to the optical system.

In projecting transparencies, it is often desired to show the pictures in a sequence different from that in which they are arranged in the cassette. It is therefore a principal object of the present invention to provide an improved device so that pictures stored in cassettes may be brought into the projection position in any sequence.

Another, more specific object of the present invention relates to a slide-changing equipment having at least one cassette for transparencies moveable relative to the optical system, and wherein for the individual selection of pictures in any order, the projection apparatus is provided with at least one control strip and a set of contact members contacting therewith, the control strip being divided into fields according to a binary code system, each position of the cassette corresponding to a particular combination of fields, and wherein the control strip or the carrier of the set of contact members is driveably connected with advancing means for the cassette, and wherein electric control means are provided which act in such a way that the advance of the cassette is interrupted when the desired position is reached.

A further object of the present invention is to provide a projection apparatus of the above nature, characterized by its simplicity, ruggedness and accuracy.

Figure 6:
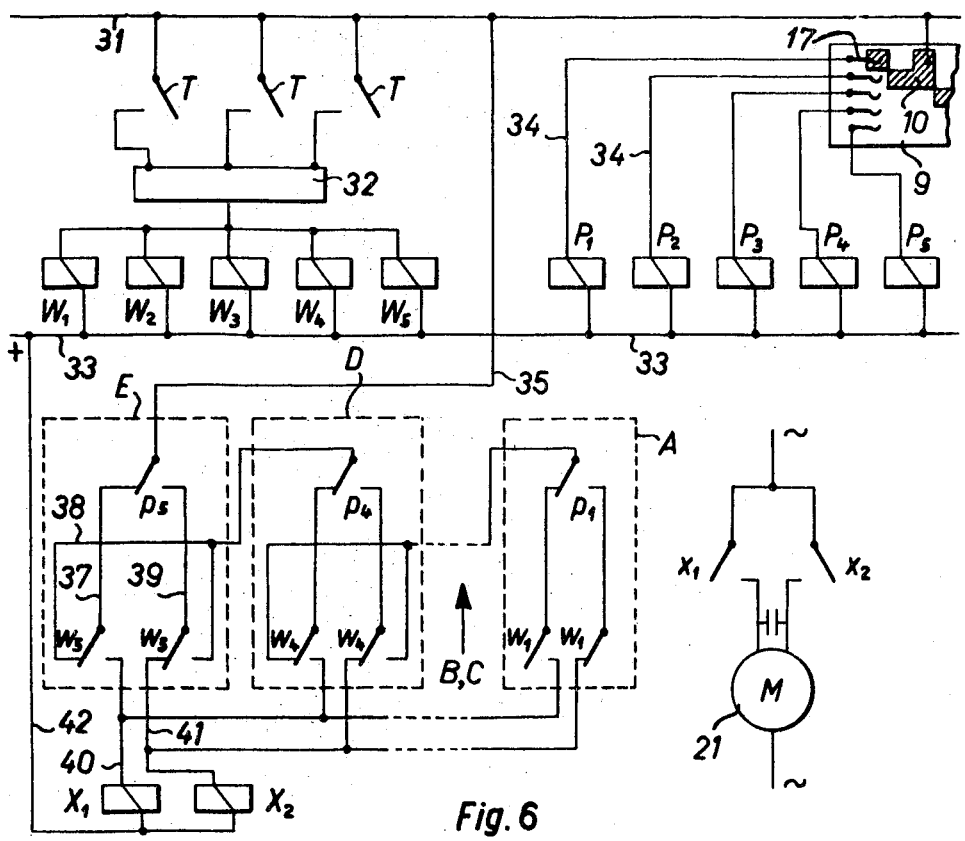

The above and other objects of the present invention will become apparent from the following description taken in conjunction with the accompanying drawing, wherein:

FIG. 1 is a section through the control and conductor strips, with the carriage, FIG. 2 is a section through the contact spring carrier, FIG. 3 is a view of a control strip, FIG. 4 is a view of a conductive strip, FIG. 5 is a prospective view of the projection apparatus with covers removed, and FIG. 6 is a schematic circuit diagram.

The projection apparatus includes a support or plate 1 on which the optical system 23 and the slide-changing mechanism is mounted. The individual slides or transparencies 29 to be projected are located in two cassettes 2, from which they can be brought into the projection position by lateral movement with the aid of an arm 24. The pusher arm 24 is mounted on two parallel horizontal guide rods 26, slidably mounted in a support 27 as shown in FIG. 5. On changing the transparency, the pusher arm 24 comes to lie against a side surface of a transparency 29 and pushes this in the direction of arrow A in FIG. 1 into the light beam of the optical system 23. Simultaneously, the previously projected transparency is pushed back into the other cassette. The pushing movement is effected with the aid of a pinion or cog 28 engaging in a toothed rack 25, which cog is driven by a motor. The projection apparatus is normally covered by a housing not shown in FIG. 5. Four legs 20 are connected to the plate 1.

Two separate cassettes 2 are present, which are arranged to left and right of the optical system 23. Since the cassettes 2 are identically constructed, and since also the mechanical advancing means and the electrical control means are constructed identically, only one unit is hereinafter described.

The alignment of cassette 2 in its longitudinal direction in order to bring another transparency 2 into the region of pusher arm 24 is effected by a pin 3 which extends through the plate 1 and engages from below in the floor of the cassette. The pin 3 is mounted in a sliding carriage 4 which can be stepwise or continuously moved with the aid of a motor-driven screw spindle 5 cassette 2 is further supported on a cylindrical guide bar 6, so that the cassette 2 can move back and forth between guide rails 7 and 8 in its longitudinal direction and parallel to the optical axis of the apparatus.

On the underside of plate 1 a control strip 9 is rigidly fixed. This control strip 9 is provided with contact springs 10, the particular shape of which is evident from FIG. 2. There are in all five parallel-running metallic contact strips, extending in the longitudinal direction of control strip 9, which are denoted $a$ to $e$ on the left-hand edge as seen in FIG. 3. These preferably take the form of a printed circuit on an insulative board; they can however, be constructed of metal stampings. The contact fields 20 contain contact pieces 13, between which empty spaces 14 are located.

Since each cassette 2 is provided for reception of a total of 30 transparencies, there are, in the long direction of control strip 9, for example on contact strip $a$, altogether 15 contact pieces 13 and 15 empty spaces 14, the contact fields 10 are arranged according to the binary code system, so that in this way each of the 30 possible cassette positions has associated with it a definite combination of contact and space positions, which occurs only once. At position X (FIG. 3), for example, contact strips $a$, $b$ and $e$ are arranged with contact pieces, while in contact strips $c$ and $d$, nonconducting empty spaces are present.

Below the control strip 9 is fixedly located an approximately same-sized conductor strip 15 running parallel to control strip 9, with five parallel adjacent contact tracks 19, as is evident from FIG. 4. Between the control strip 9 and the conductor strip 15 extends a carriage part 16, which is studded with sets of contact springs 17, 18. The upper and lower contact springs 17 (FIG. 2) are electrically connected by metallic rivets 18. Thus the lower contact springs touch the contact tracks 19 of the conductor strip 15, while at the same time the upper contact springs touch the contact fields 10. Each contact strip $a$ to $e$ is thus provided with an upper contact spring 17. The contact fields 10 are connected to a source of electric current.

By means of a chain of relays, constructed of twice-five relays, the desired position of the cassette 2 can be controlled. By press-buttons or a selector disc a desired transparency number is fed in and stored in binary code by the relays. The electric circuitry first fixes the actual position of the cassette and there after sets the drive motor in motion toward the right turning direction. Each cassette position, and thus each transparency, has a unique own contact combination on the control strip 9.

In FIG. 6 the principal electrical circuit is illustrated. The pushbuttons T serve to select the desired transparency for projection. More than three illustrated press-buttons are used, that is, as many as are required for the maximum number of transparencies provided, for example 30 transparencies. The press buttons T are connected to a supply lead 31 connected to the negative pole, and are connected with a diode matrix 32. To this is connected a first set of five relays W1, W2, W3, W4 and W5, which are connected to a lead 33 connected to the positive pole.

There is further present a second set of five relays P1, P2, P3, P4 and P5, which are connected via the contact springs 17 with the contact fields 10 of the control strip 9. The electrical connection between the contact springs 17 and these relays P1–P5 is over leads 34, to close the circuit to the positive pole via lead 33.

To each of the relays are attached contacts, the relay coils being denoted with capital letters and the contacts operated thereby with the same lower case letters. As is evident from FIG. 6, there are altogether five switching blocks present, A, B, C, D and E, which each contain three switching elements and which form a cascade circuit. Since these switching blocks are constructed identically, blocks B and C are not drawn. A lead 35 connected to the supply lead 31 is connected via contact $p5$ via lead 37 with contact $w5$. From this, a lead 38 runs to the next switching block D, where again the same contact arrangement is to be found. If, for example, relay P5 is energized, contact $p5$ switches over, so that thereafter current flows via lead 39, contact $w5$ and lead 41 to relay X2. This relay X2 connects via lead 42 and thus closes contact $x2$, which is located in the circuit of the drive motor 21 for spindle 5. This turns until the carriage 4 and thus the contact springs 17 are at that point on the control strip 9 which corresponds to the transparency desired to be projected. If for example, as a result of a particular pressed button the relay W5 is energized, both contacts w5 switch over and relay X1 receives current. As a result of this, contact x1 is connected in the circuit of motor 21, and thus AC motor then turns in the opposite direction. Thus it is obtained that the cassette is moved from its position immediately into the newly desired position by right-or-left-hand turning of spindle 5, without it having first to reach an end position and then from that be controlled to reach the new position.

It would also be possible, in place of two cassettes 2, to use only a single one. Two cassettes 2 have, however, the advantage that during the projection of one picture, the other cassette can be moved into the desired position for the next picture.

In place of straight cassettes, round cassettes may also be used.

While there has been described and illustrated a preferred embodiment of the above invention it is apparent that numerous alterations, omissions and additions may be made without departing from the spirit thereof. Accordingly,

What is claimed is:

1. A projection apparatus with an optical system and at least one cassette for slides, said cassette being movable in a predetermined path in the apparatus, comprising:
   support means;
   means for the individual selection of slides in any order;
   a rotary drive means;
   a digital slide-positioning assembly including at least one control strip element divided into a plurality of contact fields according to a binary code system, in which each position of the cassette corresponds to a particular combination of fields, and a contact member element cooperating with said control strip element;
   a carriage means carrying one of said elements of said digital positioning assembly;
   rotary-to-linear movement conversion means interconnecting said rotary drive means and said carriage to drive said carriage means by said drive means to effect, upon operation of said drive means, relative movement between said control strip element and said contact member element;
   an electric control means interrupting said driving means when the desired position of the cassette is reached;
   and a projecting member extending from said carriage means releasably into said cassette.

2. Apparatus according to claim 1, wherein said rotary-to-linear movement conversion means comprises a motor-driven screw spindle.

3. Apparatus according to claim 1, wherein said control strip is straight and fixedly connected to said support means, the predetermined path of movement of the cassette is a straight line and, in its long direction, parallel to the control strip.

4. Apparatus according to claim 1, wherein said digital slide-positioning assembly further includes
   a conductor strip arranged parallel to said control strip element, said conductor strip comprising a plurality of contact tracks running parallel to the direction of the control strip element, and said set of contact members contact both the control strip element and the conductor strip.

5. Apparatus according to claim 4, wherein said control strip element and said conductor strip lie below one another, said carriage is located between said control strip and said conductor strip.

6. A projection apparatus as defined in claim 5, wherein two cassettes are arranged one on each side of the optical system, each cassette is equipped with its own control strip, its own carriage and its own drive motor for advancing the cassette.

7. Apparatus according to claim 1, wherein said electrical control means comprises
   a pushbutton array for the selection of a desired cassette position, and a cascade-switching unit with electric switching means, said switching means being so arranged that operation of the motor for the cassette means advance is arrested when the desired position is obtained.

8. Apparatus according to claim 7, wherein said switching means includes
   a first set of relays, a diode matrix connected to said first set of relays and to selector means for the selected slide, a second set of relays, a control strip being divided into contact fields according to a binary code system, said second set of relays being connected to said control strip for instantaneous comparison of the desired and actual position of the cassette means by a cascade circuit.

* * * * *